United States Patent [19]

Richardson

[11] 4,341,655

[45] Jul. 27, 1982

[54] METHOD OF PREPARING COLLOIDAL SOL OF PENTAVALENT ANTIMONY

[75] Inventor: John G. Richardson, Middleburg Heights, Ohio

[73] Assignee: The Harshaw Chemical Company, Cleveland, Ohio

[21] Appl. No.: 135,046

[22] Filed: Mar. 28, 1980

[51] Int. Cl.$^3$ .............................................. B01J 13/00
[52] U.S. Cl. .............................. 252/313 R; 106/18.28; 252/610
[58] Field of Search ........................... 252/313 R, 610; 106/18.28

[56] References Cited

U.S. PATENT DOCUMENTS

| | | | |
|---|---|---|---|
| 3,657,179 | 4/1972 | Yates | 106/18.27 X |
| 3,676,362 | 7/1972 | Yates | 252/8.1 X |
| 3,860,523 | 1/1975 | Petrow et al. | 252/313 R X |
| 3,994,825 | 11/1976 | Crompton et al. | 252/314 X |
| 4,110,247 | 8/1978 | Grower II et al. | 252/313 R |

Primary Examiner—Richard D. Lovering
Attorney, Agent, or Firm—Armand P. Boisselle; James A. Lucas

[57] ABSTRACT

A method of preparing colloidal sols of pentavalent antimony containing increased amounts of metal is described. More particularly, a method of converting substantially water-insoluble metal antimonates to colloidal sols of pentavalent antimony is described. The method comprises mixing a substantially water-insoluble metal antimonate with a pentavalent antimony sol and agitating the mixture for a period of time sufficient to convert at least a portion of the crystalline metal antimonate to the colloidal state. The colloidal sols obtained in the described manner contain an increased amount of the metal, and such sols are useful as flame-retardants.

5 Claims, No Drawings

METHOD OF PREPARING COLLOIDAL SOL OF PENTAVALENT ANTIMONY

BACKGROUND OF THE INVENTION

Attempts have been made to incorporate metallic oxides such as antimony oxide into organic polymers, both natural and synthetic, to improve their properties. For example, these oxides have been used to improve the resistance to burning, particularly when employed in conjunction with organic halogen compounds and other halogen-containing materials. While the exact mechanism which results in the flame-retardant properties is not fully understood, it is believed that an antimony oxide halogen compound may be formed in situ which interferes with oxidizing reactions and therefore inhibits burning.

A variety of techniques have been employed to introduce the metal oxides into organic polymers. For example, oxide particles prepared by milling have been suspended in spinning solutions, molding solutions, or polymer melts in attempts to incorporate the oxide in the resulting film, fiber or molded body. The use of this technique generally results in delustering of the polymer due to the scattering of light by the large oxide particles, and the large particles also have relatively low chemical reactivity and a low efficiency as a flame proofing agent. In the case of fibers, the diameter of the oxide particles may approach the diameter of the fibers themselves thereby weakening the bond between the organic polymer and the oxide.

Oxides also have been applied as surface coatings along with a resinous binder. These coating techniques, however, also result in delustering and produce fabrics which have a stiff, harsh hand, poor flexibility and low tear strength.

Additional attempts have been made in the art to avoid some of the deficiencies of the above procedures by using aggregates of oxides prepared as gels, as precipitated powders, and as aggregates prepared by oxidizing the corresponding metallic halides. The use of aggregates, however, has resulted in non-uniformity of properties resulting from the difficulties of preparing uniform aggregates and homogeneously distributing the aggregates throughout the polymer.

More recently, it has been discovered that antimony oxide prepared as sols of colloidal particles of antimony oxide dispersed in various liquid media is useful. For example, U.S. Pat. No. 3,676,362 describes sols composed of substantially discrete colloidal particles of antimony oxide having an average particle size in the range of about 2 to about 50 millimicrons dispersed in a polar, organic liquid. Such sols can be mixed with a solution of a polymer in a polar organic liquid, and the mixture processed in a conventional manner for making fibers and films. These sols are prepared by reacting a metal halide with water and ammonia in a polar organic liquid. The water converts the halide to antimony oxide in colloidal dispersion and an ammonium salt precipitates.

U.S. Pat. No. 3,860,523 describes the preparation of colloidal antimony oxide sol, preferably in the $Sb_2O_5$ form with an average particle diameter of about 2 to 100 millimicrons. The sol is prepared by first preparing water-soluble potassium antimonate by reacting antimony trioxide with potassium hydroxide and hydrogen peroxide in the ratio of 1 mole to 2.1 moles to 2 moles, and thereafter deionizing the potassium antimonate by passing the solution through a hydrogen form cation exchange resin.

Another method for forming sols of antimony pentoxide is described in U.S. Pat. No. 3,657,179. This patent describes the reaction of antimony trichloride with nitric acid to form a dispersion in a polar organic solvent and stabilizing the dispersion with an alpha-hydroxy carboxylic acid. Such dispersions contain from about 0.01 to 5% water by weight.

Another process for preparing colloidal dispersions of antimony pentoxide is described in U.S. Pat. No. 3,994,825, and the process involves mixing particles of antimony trioxide with an aliphatic polyhydroxy alcohol having vicinal hydroxyl groups and contacting said particles with hydrogen peroxide to convert the antimony trioxide to hydrous antimony pentoxide. Reaction preferably is accomplished at a temperature of between 50° and 105° C. The colloidal sol which results is a stable dispersion containing antimony pentoxide with a reported average size of from about 50 Angstroms to about 200 Angstroms.

U.S. Pat. No. 4,110,247 describes the preparation of colloidal aqueous sols of pentavalent antimony from water-insoluble metal antimonates by contacting the antimonate with a cation exchange resin. Preferably the insoluble antimonate, for example, sodium antimonate, is contacted with the cation exchange resin in a fluidized bed.

SUMMARY OF THE INVENTION

This invention relates to a method for preparing colloidal aqueous sols of pentavalent antimony, and more particularly, to a method of converting substantially water-insoluble metal antimonates into sols of pentavalent antimony. The method of the invention comprises mixing a substantially water-insoluble crystalline metal antimonate with a pentavalent antimony sol and agitating the mixture for a period of time sufficient to convert at least a portion of the crystalline metal antimonate to colloidal pentavalent antimony. The colloidal sol of the invention containing an increased amount of metal is recovered and separated from any unconverted metal antimonate by a suitable means such as filtration. The filtrate can be concentrated if desired.

DESCRIPTION OF THE PREFERRED EMBODIMENTS

The present invention relates to a method of preparing colloidal sols of pentavalent antimony containing increased amounts of metal other than antimony from substantially water-insoluble metal antimonates. As mentioned above, colloidal sols of pentavalent antimony have been prepared from water-soluble antimonates such as potassium antimonates, and one such method has been described in U.S. Pat. No. 3,860,523. The preparation of pentavalent antimony sols from water-insoluble metal antimonates utilizing a cation exchange resin has been described in U.S. Pat. No. 4,110,247. The method of this invention for converting water-insoluble metal antimonates to colloidal sols does not require the use of cation exchange resins so long as some pentavalent antimony sol is available to initiate the process of the invention.

The water-insoluble metal antimonates which are useful in the method of this invention are those antimonates which generally are considered in the art as being water-insoluble even though a small quantity of the material may in fact be soluble in water at various temperatures. For example, hydrated sodium antimonate [NaSb(OH)$_6$] is considered to be a water-insoluble antimonate in the art and in this application since reportedly only 0.03 gram of sodium antimonate is soluble in 100 ml. of water at 12.3° C. and 0.3 gram is soluble in 100 ml. of water at 100° C. Thus, as used in this specification and in the claims, the term water-insoluble embraces those metal antimonates which are substantially water-insoluble.

Examples of water-insoluble metal antimonates, in addition to the hydrated sodium antimonate, include calcium antimonate, magnesium antimonate, barium antimonate, copper antimonate, etc.

The metal antimonates which are useful in the method of the invention are known and several are commercially available. Water-insoluble metal antimonates can be prepared from water-soluble potassium antimonate by the addition of a metal (in the form of a metal salt) to a solution of the antimonate. The metal will exchange with the potassium ion to form an insoluble metal antimonate which precipitates from the solution. For example, sodium, barium, and copper antimonates can be prepared from potassium antimonate by adding sodium chloride, barium chloride or copper chloride to solutions of potassium antimonate.

In the first step of the method of this invention, substantially water-insoluble crystalline metal antimonates of the type described above are mixed with an aqueous pentavalent antimony sol. The source of the antimony sol utilized in the first step is not critical. For example, the sol can be prepared in accordance with the procedure of U.S. Pat. No. 4,110,247 wherein a slurry of a water-insoluble metal antimonate in water is contacted with a cation exchange resin for a period of time which is sufficient to convert the metal antimonate to colloidal pentavalent antimony. The disclosure of U.S. Pat. No. 4,110,247 is hereby incorporated by reference.

The antimony sols utilized in the first step of the present invention can be prepared by other methods known in the art. For example, the procedures described in U.S. Pat. Nos. 3,676,362; 3,860,523; 3,657,179; and 3,994,825 can be utilized.

The amount of substantially water-insoluble crystalline metal antimonate mixed with the aqueous pentavalent antimony sol in the first step of the process is not critical and can be varied over a wide range. Among the factors to be considerd in determining the amount of water-insoluble metal antimonate to be incorporated into the antimony sol are the concentration of pentavalent antimony in the initial sol and the amount of metal other than antimony desired to be incorporated into the antimony sol. Since the metal other than antimony is derived from the metal antimonate mixed with the sol, an increase in the amount of metal antimonate converted to colloidal pentavalent antimony in the process of the invention results in an increase in the metal content of the sol produced by the method of the invention. The initial pentavalent antimony sol may contain an amount of one or more metals different from the metal present in the water insoluble metal antimonate, and, in such instances, the sol produced in accordance with the method of the invention will contain two or more different metals. For example, the initial pentavalent antimony sol may contain a small amount of sodium ions, and the metal antimonate which is mixed therewith can be barium antimonate. The resulting pentavalent antimony sol will contain a mixture of sodium ions and barium ions.

The amount of antimony contained in the sols prepared in accordance with the method of the invention can vary up to 40% or higher although 40% antimony appears to be a practical upper limit. The sols containing higher concentrations can be prepared from sols initially containing greater amounts of antimony or a sol prepared from more dilute pentavalent antimony sols can be concentrated after the water-insoluble antimonate has been dissolved in the initial sol. The amount of metal ions contained in the antimony sols prepared in accordance with the method also can be varied as desired. When expressed in terms of mole ratio of metal to antimony in the colloidal sol, various mole ratios can be obtained, and the mole ratio can be as low as 0.05:1. Mole ratios of metal to antimony of at least about 0.3:1 are preferred in, for example, applications for improving the flame retardant properties of materials. Mole ratios of 0.45 or higher are particularly preferred for such applications.

In the second step of the method of this invention, the mixture of substantially water-insoluble crystalline metal antimonate and the aqueous antimony sol is agitated, generally at room temperature, for a period of time which is sufficient to convert at least a portion of the crystalline metal antimonate to colloidal pentavalent antimony. The progress of the conversion of the metal antimonate to colloidal antimony can be followed by observing the decrease in the amount of insoluble metal antimonate. Any unconverted water-insoluble metal antimonate can be separated from the colloidal pentavalent antimony formed in accordance with the method of the invention by known techniques such as filtration. The filtrate comprises the desired colloidal pentavalent antimony.

When the initial pentavalent sol used in the invention is a sol prepared in accordance with the process of U.S. Pat. No. 4,110,247, it is preferred that the sol be aged before the antimonate is added. Aging of the sol can be effected at ambient temperature for a period of up to 24 hours or more, or at an elevated temperature for a shorter period. For example, aging is accelerated by heating to a temperature of about 55° C. and maintaining the sol at this temperature for two hours.

The following examples illustrate the process of the invention for preparing colloidal aqueous sols of pentavalent antimony. Unless otherwise indicated, all parts and percentages are by weight.

EXAMPLE 1

Two hundred grams of pentavalent antimony sol containing about 36% $Sb_2O_5$ (0.222 mole) is placed in a beaker. This antimony sol, prepared in accordance with the procedure of U.S. Pat. No. 4,110,247 contains about 27.1% Sb, 0.26% sodium, 0.007% sulphur and has a specific gravity of 1.485. To the sol there is added 6.1 grams of hydrated sodium antimonate (41.2% antimony, 8.37% sodium) which is equivalent to adding 0.022 mole of sodium and 0.021 mole of antimony. The mixture is agitated with stirring for about 4.5 hours and filtered. Only a slight amount of solid was retained on the filter paper. The filtrate analyzes 0.46% sodium, 27.6% antimony and 0.01% sulphur. The sodium/antimony mole ratio increased from 0.05 to 0.09.

EXAMPLE 2

To 171 grams of the pentavalent antimony sol containing 27.1% antimony described in Example 1, there is added 100 ml. of deionized water followed by 168.4 grams of hydrated sodium antimonate (44.0% Sb, 8.45% Na) over a period of 1.5 hours with good agitation. The slurry is agitated for an additional five hours and then filtered through a #4 Whatman filter paper. A considerable amount of unreacted sodium antimonate is collected on the filter paper. After drying, the unreacted antimonate weighed 107 grams indicating that about 45 grams of the antimonate was converted to pentavalent antimony sol. Analysis of the filtrate (the desired pentavalent antimony sol) indicates an antimony content of 16.9%, a sodium content of 0.99% and a sodium to antimony mole ratio of 0.31.

EXAMPLE 3

To 960 ml. of deionized water, there is added 22 grams of a 36% antimony sol as described in Example 1. Hydrated sodium antimonate (18.3 grams) is slurried into the sol with agitation for about 22 hours. The bulk of the sol is passed through a #4 Whatman filter paper to separate any unreacted sodium antimonate. The filtrate is the desired pentavalent antimony sol analyzing 0.11% sodium and 1.15% antimony indicating a sodium to antimony mole ratio of 0.51.

EXAMPLE 4

Eleven grams of sodium antimonate (44% Sb, 8.45% Na) is added to 500 ml of approximately 2% pentavalent antimony sol which has been treated with chlorine. The slurry is agitated for about 17 hours and filtered. About 4.5 grams of the antimonate is recovered as residue, and the filtrate analyzes 0.089% sodium and 1.54% antimony. The sodium to antimony mole ratio is 0.30.

As mentioned above, the colloidal pentavalent antimony sols prepared in accordance with the method of the invention improve the flame-retardant properties of various materials including fibrous materials, polymers and plastics in the presence of or absence of halogen compounds normally used for improving the flame retardant properties of various materials.

The utility of the sols of the invention as flame retardants is similar to the utility of the colloidal antimony dispersions containing an alkali metal described and claimed in co-pending application Ser. No. 068,260, filed Aug. 20, 1979, now U.S. Pat. No. 4,307,148, issued on Dec. 22, 1981, of Destin A. LeBlanc for "Flame Retardant With Improved Durability", which disclosure is hereby incorporated by reference.

The present invention provides a method of preparing additional amounts of pentavalent antimony sols while reducing the amount of ion exchange resin required for converting metal antimonates to pentavalent antimony sols. For example, for converting a given amount of water-insoluble metal antimonate to pentavalent sol, it is now possible to convert two-thirds of the antimonate using ion exchange media and the remaining one-third by merely dissolving the insoluble antimonate in the prepared pentavalent antimony sol. The method of the invention not only provides a less expensive method for preparing sols, it also provides a facile method for preparing higher concentration sols utilizing reduced amounts of energy.

I claim:

1. A process for preparing a colloidal aqueous sol of pentavalent antimony containing increased amounts of metal which comprises the steps of
   (a) preparing a mixture of a substantially water-insoluble crystalline metal antimonate and an aqueous pentavalent antimony sol,
   (b) agitating said mixture in the absence of cation exchange resins for a period of time sufficient to convert at least a portion of the crystalline metal antimonate to colloidal antimony, and
   (c) recovering the colloidal pentavalent antimony sol containing an increased amount of metal.

2. The process of claim 1 wherein the colloidal pentavalent antimony recovered in step (c) is separated from any unconverted crystalline metal antimonate by filtration.

3. The process of claim 1 wherein the crystalline metal antimonate is sodium antimonate.

4. The process of claim 3 wherein the mole ratio of sodium to antimony in the colloidal sol recovered in step (c) is at least about 0.3:1.

5. The process of claim 1 wherein the aqueous pentavalent antimony sol used to prepare the mixture in step (a) is an aged sol.

* * * * *